No. 753,659. Patented March 1, 1904.

UNITED STATES PATENT OFFICE.

RENÉ BOHN, OF MANNHEIM, GERMANY, ASSIGNOR TO BADISCHE ANILIN UND SODA FABRIK, OF LUDWIGSHAFEN-ON-THE-RHINE, GERMANY, A CORPORATION OF BADEN.

ANTHRACENE DERIVATIVE AND PROCESS OF MAKING SAME.

SPECIFICATION forming part of Letters Patent No. 753,659, dated March 1, 1904.

Application filed December 1, 1903. Serial No. 183,393. (No specimens.)

*To all whom it may concern:*

Be it known that I, RENÉ BOHN, doctor of philosophy and chemist, a citizen of the Swiss Republic, residing at Mannheim, in the Grand Duchy of Baden, Empire of Germany, have invented new and useful Improvements in Anthracene Derivatives and Processes of Making the Same, of which the following is a specification.

In the specification of Letters Patent No. 739,579, dated September 22, 1903, I have described the production of halogen derivatives of the coloring-matter known in commerce as "indanthrene," these derivatives being prepared by treating indanthrene with halogen or with bodies generating halogen. I have now discovered that by the action of a mixture of nitric acid and hydrochloric acid on indanthrene a new yellowish-brown compound is formed, which I regard as chlor-anthraquinone-azine, which on reduction—for example, on treatment with sodium hydrosulfite and alkali—is converted into a chlorindanthrene.

My new yellowish-brown product can be used directly for dyeing in the presence of sodium hydrosulfite and alkali. The dyeings obtained on cotton are a greener blue than those of indanthrene and are extremely fast to chlorin.

The following example will serve to further illustrate the nature of my invention, which, however, is not confined to this example. The parts are by weight.

Example: Introduce ten (10) parts of indanthrene into a mixture of eighteen (18) parts of fuming nitric acid (containing about ninety-four (94) per cent. of $HNO_3$) and forty-five (45) parts of fuming hydrochloric acid (containing about thirty-nine per cent. of HCl) at a temperature of ten degrees centigrade, (10° C.) Raise the temperature gradually to fifty degrees centigrade, (50° C.,) and after three (3) hours pour the whole mixture into one thousand (1,000) parts of water and filter and wash the residue, which is the desired yellowish-brown product.

Instead of pure indanthrene the blue coloring-matter obtained according to the specification of Letters Patent No. 682,523, dated September 10, 1901, may be used.

What I claim is—

1. The process for the production of an anthracene derivative by treating indanthrene with a mixture of nitric acid and hydrochloric acid.

2. The yellowish-brown anthracene derivative which is insoluble in water and which by the action of reducing agents yields chlorindanthrene.

In testimony whereof I have hereunto set my hand in the presence of two subscribing witnesses.

RENÉ BOHN.

Witnesses:
ERNEST F. EHRHARDT,
JACOB ADRIAN.